G. P. APPLETON.
Machines for Sawing Laths.

No. 140,570. Patented July 8, 1873.

Witnesses:
Saml. Appleton
Clifton R. Appleton

Inventor:
Geo. P. Appleton

G. P. APPLETON.
Machines for Sawing Laths.

No. 140,570. Patented July 8, 1873.

2 Sheets--Sheet 2.

Witnesses:
Saml. Appleton
Clifton R. Appleton

Inventor:
Geo. P. Appleton

UNITED STATES PATENT OFFICE.

GEORGE P. APPLETON, OF SUNCOOK, NEW HAMPSHIRE.

IMPROVEMENT IN MACHINES FOR SAWING LATHS.

Specification forming part of Letters Patent No. 140,570, dated July 8, 1873; application filed April 21, 1873.

*To all whom it may concern:*

Be it known that I, GEORGE P. APPLETON, of Suncook, in the county of Merrimac and State of New Hampshire, have invented certain new and useful Improvements in Machines for Sawing Laths, Pickets, Staves, &c., of which the following, taken in connection with the accompanying drawings, is a full and clear description.

Hitherto the arrangement of the saw and its feed-rolls has been such that in machines of this class the material could be sawed in one direction only. Such an arrangement of course necessitated a transfer by hand of the material back from the rear to the front of the machine, after once passing through, in case another cut was to be made, as in sawing laths, pickets, &c., from board lumber. Such transfer occasioned great loss of time and power, a large percentage of the operator's time being consumed in conveying the material from rear to front, during which time the power driving the saw is lost.

The object of my invention is to obviate this by so constructing a sawing-machine that the material may be fed back, instead of being carried back, and be also subjected to the action of the saw during such feeding; and it consists, first, in such an arrangement and combination of the frame and saw that the saw can be utilized to cut on both sides of its arbor at one and the same time, or consecutively, as may be desired; second, in the arrangement of the feed-rolls, or other feeding-device, whereby the aforementioned double cut is facilitated, and the handling of the lumber obviated.

Figures 1, 2:
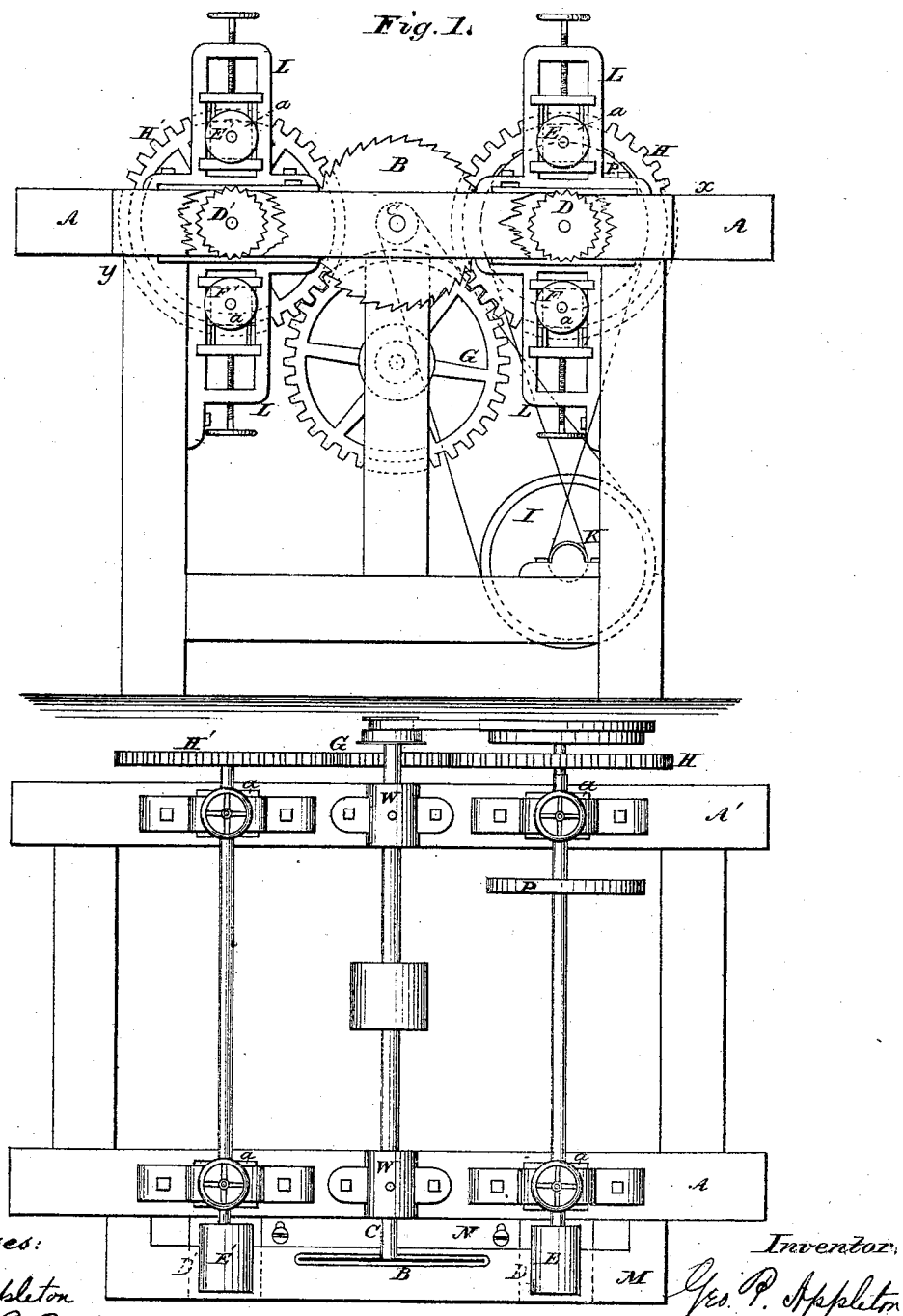
Figure 3:
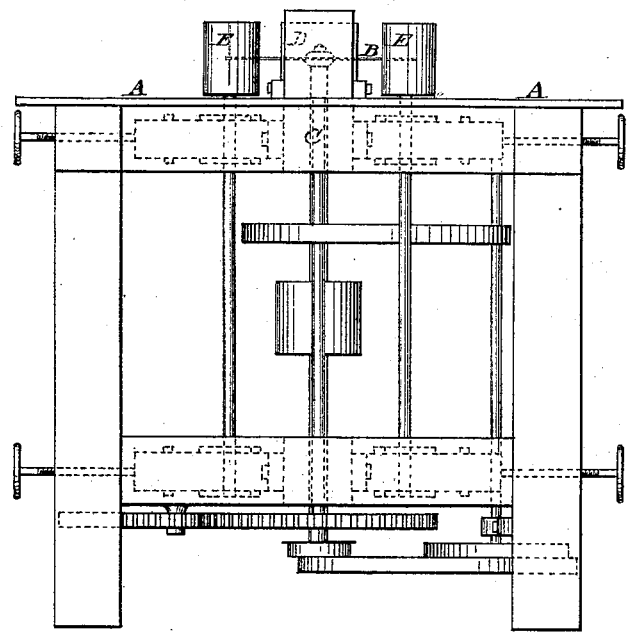
Figure 4:
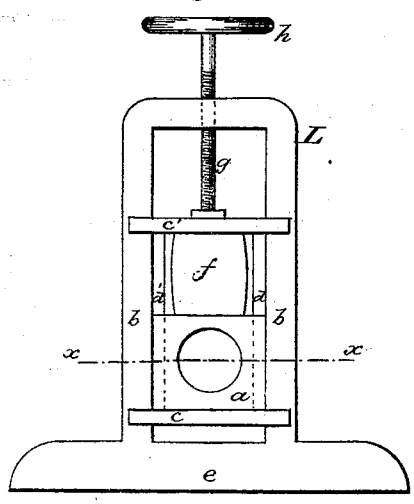
Figure 5:
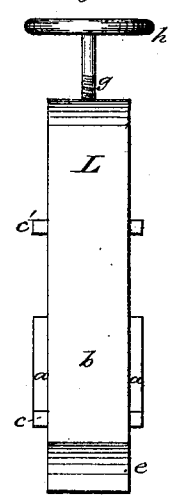
Figure 6:

Referring to the drawings, Figure 1 represents a side view of a machine embodying my invention, with the side broken away to show the feed-rolls. Fig. 2 represents a top plan of the same. Fig. 3 represents an end view of a modification thereof. Fig. 4 represents a front, and Fig. 5 represents a side, view of my improved journal-box and frame. Fig. 6 represents a transverse section of the same taken on the line X X of Fig. 4.

A represents the frame of the machine. Upon this frame boxes W are supported, affording bearings to the arbor C of the saw B, and preferably so arranged that the saw shall project equally upon both sides of the sawing-bed M projecting from the frame. On both sides of the saw are arranged the main feed-rolls D D', which are ordinary fluted feed-rolls. The arbors of these rolls are arranged in the same plane as the arbor of the saw. The circumference of these rolls is slightly greater than the thickness of the feeding-table, so that their feeding-surfaces project both above and below the table. The main feed-roll D receives motion from the saw-arbor by means of the pulleys C I K P, motion being communicated to the other main roll through the gearing H G H'. Upon the top of the frame I arrange the auxiliary feed-rolls E E', and below the frame the set F F'. These sets are immediately over and under, respectively, the main rolls D D', and act in conjunction therewith. Their arbors have bearings in boxes $a$, adjustable in the frames L, as hereinafter explained, and they receive motion by friction from the material fed in by the main rolls. The material being fed in at $x$ passes along on the top of the table to $y$, where it is fed back under the table for another cut. It is evident that with two operators both can be feeding in at the same time, the saw cutting on both sides of the arbor simultaneously, thus practically doubling the capacity of the machine.

In Fig. 3 I have shown a modification, in which the saw runs horizontally, being mounted vertically.

I do not, however, confine myself to the precise construction and arrangement shown, as they may be varied and modified without departing from the spirit of my invention.

Although I have shown and described but one saw, it is evident that this arrangement is equally applicable to a gang of saws.

In Figs. 4, 5, and 6 is shown, on a larger scale, the adjustable journal-boxes and frames which I use in this connection, in which L represents the frame provided with flanges for attachment to its bearings. Within this frame is another frame, consisting of the heads $c$ $c'$, connected by the side-pieces $d$ $d'$, of about the same width of the side of the frame L. The ends $e$ $c'$ are somewhat wider than the side $b$, and are mortised, the sides $b\ b'$ of the frame L fitting into such mortises, and acting as guides to the heads $c\ c'$ in their vertical movements, and preventing any lateral motion. To the head $c'$ is attached the screw-rod $g$, working through the top of the frame L, and by which the position of the heads $c\ c'$ may be adjusted in the frame L. Resting on the head $c$ is the box proper $a$, whose sides are mortised to fit the sides $d\ d'$, by which the box is guided in its vertical movement. Between the box $a$ and the head $c'$ any suitable spring, $f$, is placed, of tension sufficient to hold the box $a$ firmly to its seat on the head $c$.

It will be seen that, by the use of this box, the auxiliary feed-rolls can first be adjusted by the screw $g$ to the distance from the main rolls required for the proper feeding of the material, depending, of course, upon the average thickness of the material. When so adjusted, the spring $f$ will yield to any slight inequalities in the material, allowing the rolls to adjust themselves thereto, and get hold of the material firmly, so that the main rolls have a steady and uniform bite thereon.

Having thus described my invention, what I claim, and desire to secure by Letters Patent, is—

1. A sawing-machine substantially as herein described, in which the saw is hung to cut on both sides of its arbor at the same time, or consecutively, the feed being from opposite directions, as and for the purposes specified.

2. In a sawing-machine the upper and lower auxiliary rolls $E\ E'\ F\ F'$, in combination with the main rolls $D\ D'$, as and for the purposes specified.

GEORGE P. APPLETON.

Witnesses:
CLIFTON R. APPLETON,
SAMUEL APPLETON.